United States Patent Office 2,805,983
Patented Sept. 10, 1957

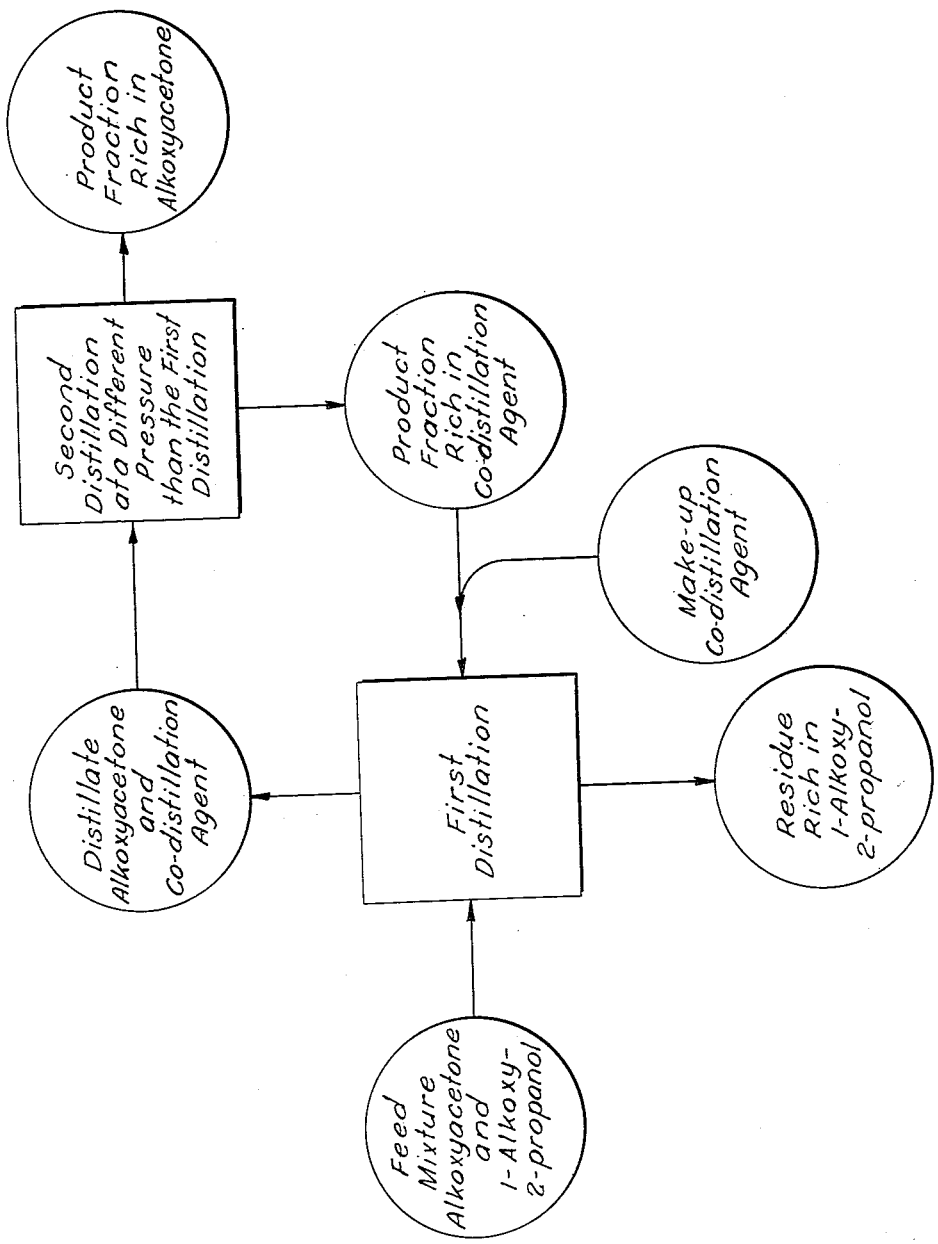

---

2,805,983

SEPARATION OF ALKOXYACETONES AND ALKOXY-2-PROPANOLS FROM MIXTURES THEREOF

Lee H. Horsley, Midland, Mich., assignor to The Dow Chemical Company, Midland, Mich., a corporation of Delaware Application April 5, 1954, Serial No. 420,837

16 Claims. (Cl. 202—42)

This invention pertains to a method for separation of alkoxyacetones and/or alkoxy-2-propanols from mixtures thereof which ordinarily form azeotropes during distillation.

In the preparation of alkoxyacetones from the corresponding alkoxy-2-propanols, e. g. by dehydrogenation or oxidation of the alkoxy-2-propanol, there is usually obtained a reaction product mixture comprising both the alkoxyacetone product and the unreacted alkoxy-2-propanol starting material. The separation of such a reaction product by distillation is usually difficult, if not impossible, due to the formation of an azeotropic mixture of the alkoxyacetone and the corresponding alkoxy-2-propanol during distillation.

It has been proposed to separate such mixtures by esterifying the alkoxy-2-propanol component with a suitable acid, separating the resulting ester from the alkoxyacetone, e. g. by fractional distillation, and thereafter saponifying the separated ester to regenerate the alkoxy-2-propanol. It has also been proposed to make chemical derivatives of the alkoxyacetone, such as the bisulfite addition product, to separate such derivatives from the alkoxy-2-propanol component of the mixture, and subsequently to regenerate the alkoxyacetone from its purified derivative.

From a practical standpoint, these proposals have been unsatisfactory for one or more of several reasons. The procedures require additional chemical process steps and the expenditure of additional raw materials. The degree of purification is often not satisfactory and the recovery of the desired product is sometimes poor. Usually only one component of the mixture can be satisfactorily recovered in pure form. For these reasons, the known methods of separating such mixtures are not well adapted to commercial use.

U. S. Patent 2,324,255 describes a method for separation of azeotropic mixtures of alcohols and ketones by redistillation at a different pressure, whereby the composition of the azeotrope changes to permit obtaining at least one of the components in a form substantially free of the other. Its method is not satisfactorily effective for the separation of alkoxyacetones from alkoxy-2-propanols, presumably because the presence of the alkoxy group sufficiently modifies these materials that they no longer behave as simple ketones and alcohols.

An object of this invention is to provide an improved method for separation of alkoxyacetones and/or alkoxy-2-propanols from mixtures thereof which ordinarily form azeotropes during distillation.

A further object is to provide such a method whereby at least one member of the group consisting of alkoxyacetones and alkoxy-2-propanols can be separated from azeotropic mixtures thereof in a form substantially free from the other.

A further object is to provide such a method which is commercially practical.

Other objects and advantages will be evident from the following description.

The objects of this invention are attained in a new and improved method, more completely described hereinafter, in which method mixtures of alkoxyacetones and alkoxy-2-propanols, which ordinarily form azeotropes with one another during distillation, are fractionally distilled in the presence of a co-distillation agent which forms lower-boiling azeotropes with the alkoxyacetones, whereby the lower-boiling azeotropes of the alkoxyacetones and the co-distillation agent are separated from residues which are enriched in respect to the alkoxy-2-propanols. The alkoxyacetone and the co-distillation agent contained in the lower-boiling azeotropic distillate can be separated from each other by redistillation of that distillate at a distillation pressure which is substantially different, i. e. either higher or lower, than the pressure at which the distillate was first obtained. At such different pressure, a second distillate and a second residue are obtained, the compositions of which are different from each other and from that of the first distillate. Depending on the pressure conditions employed in the second distillation, either the residue or the distillate therefrom consists of, or is rich in, the alkoxyacetone. Instead of redistilling the first distillate, other means, e. g. chemical means, can be employed to effect a separation thereof.

The drawing is a flow sheet of a continuous mode of practicing the invention and is self-explanatory.

The invention is applicable to the separation of azeotropic mixtures of alkoxyacetones, i. e. 1-alkoxy-2-propanones, and the corresponding 1-alkoxy-2-propanols, particularly mixtures of lower alkoxyacetones and lower alkoxy-2-propanols such as those having from four to six carbon atoms in the molecule (that is, having from one to three carbon atoms in the alkoxy group), e. g. mixtures of methoxyacetone and 1-methoxy-2-propanol; ethoxyacetone and 1-ethoxy-2-propanol; propoxyacetone and 1-propoxy-2-propanol; isopropoxyacetone and 1-isopropoxy-2-propanol.

The added agent employed herein to provide an azeotrope separable from the alkoxy-2-propanol by distillation is an unsubstituted monohydric aliphatic alcohol, preferably such an aliphatic alcohol having a normal boiling point of from about 78° to about 160° C., i. e. the unsubstituted monohydric aliphatic alcohols having from 2 to 6 carbon atoms in the molecule, including the saturated and unsaturated aliphatic alcohols such as ethanol, the propanols, allyl alcohol, the butanols, methallyl alcohol, the pentanols, and the hexanols. Herein the term "aliphatic alcohol" refers to such an unsubstituted monohydric aliphatic alcohol. Preferably, the aliphatic alcohol is chosen to have a boiling point close to the boiling point of the alkoxy mixture under the conditions of the distillation, so that the azeotropic distillate obtained contains an appreciable proportion of both the alkoxyacetone and the aliphatic alcohol. In other words, the higher boiling aliphatic alcohols are preferably employed with the higher boiling, higher molecular weight alkoxy mixtures. These aliphatic alcohols form azeotropic mixtures with the alkoxyacetones, but do not form azeotropic mixtures with alkoxy-2-propanols. Therefore, the azeotropic mixtures of aliphatic alcohols with alkoxyacetones can be separated by distillation from alkoxy-2-propanols. Thereafter, the alkoxyacetones can be separated from the azeotropic mixtures thereof with the aliphatic alcohols by redistillation at a different pressure, as hereinafter described.

Either or both of the distillation steps of this invention may be carried out continuously or in a batchwise manner and either may be operated independently of the other. Preferably, in commercial practice, the distillation steps are operated continuously and in an integrated fashion. Such preferred operation will be described herein, recognizing that the preferred operation can be modified in obvious ways.

In practice of the invention, one of the aforementioned aliphatic alcohols is added to the starting mixture of a 1-alkoxy-2-propanone and a corresponding 1-alkoxy-2-propanol and the resulting mixture is subjected to fractional distillation. No particular kind of distillation apparatus is required, although, obviously, the more efficient the fractionating column and the more refined the operation, the more effective will be the separation obtained. The distillation may be carried out at, above, or below, atmospheric pressure, but is preferably carried out at such a pressure that the distillate contains appreciable proportions of both the alkoxyacetone and the added aliphatic alcohol contained in the distillation charge. For a given kind of distillation charge, the lower the distillation pressure, the richer the azeotrope distillate is in the alkoxyacetone component and the less aliphatic alcohol is required to effect the desired separation.

The proportion of aliphatic alcohol which is added to the alkoxyacetone and alkoxy-2-propanol mixture is dependent upon the kind of aliphatic alcohol used, the kind and proportion of alkoxyacetone and alkoxy-2-propanol in the mixture and upon the pressure under which the first step of distillation is operated.

The distillate, obtained by fractional distillation of the mixture of 1-alkoxy-2-propanone, 1-alkoxy-2-propanol and the added aliphatic alcohol, comprises the 1-alkoxy-2-propanone and the added aliphatic alcohol and is substantially free of the 1-alkoxy-2-propanol. The residue so obtained is enriched in respect to the 1-alkoxy-2-propanol. If the fractional distillation is carried far enough, the residue can be substantially free of 1-alkoxy-2-propanone. For example, by fractional distillation of 50 mm. of mercury absolute pressure of a mixture of methoxyacetone, 1-methoxy-2-propanol and 1-propanol, there was obtained a distillate consisting of 40 percent by weight methoxyacetone and 60 percent by weight 1-propanol, and a residue consisting substantially of 1-methoxy-2-propanol.

In the second step of the method, the azeotropic mixture of alkoxyacetone and aliphatic alcohol, obtained as described above, can be redistilled at a different distillation pressure. Thereby there is obtained a distillate, which is either richer or poorer than the distillation feed in the aliphatic alcohol component and poorer or richer in the alkoxyacetone component, depending upon whether this second distillation is carried out at a higher or a lower pressure than that of the first distillation. In other words, when the second distillation is carried out at a higher pressure than the first, the proportion of aliphatic alcohol is greater, and the proportion of alkoxyacetone is less, in the second distillate than in the first distillate. Under such conditions, the residue is enriched in, and can be made to consist substantially of, the alkoxyacetone. The higher the pressure at which this second step distillation is operated, the less alkoxyacetone there is in the second distillate. If this second distillation pressure is high enough, the distillation may become non-azeotropic and the distillate then be substantially the aliphatic alcohol. Obviously, the distillation pressure must be below the critical pressure and the distillation temperature must be below the decomposition temperature of any component of the system. By way of example, the azeotrope described above, obtained by distillation at 50 mm. of mercury absolute pressure and consisting of 40 percent methoxyacetone and 60 weight percent 1-propanol, was redistilled at atmospheric pressure, whereby there was obtained a distillate consisting of 15 weight percent methoxyacetone and 85 weight percent 1-propanol and a residue consisting essentially of methoxyacetone.

Alternatively, the first distillate can be redistilled at a pressure substantially lower than that of the first distillation, thereby obtaining a second distillate which is richer in the alkoxyacetone and poorer in the aliphatic alcohol than the first distillate. Under such conditions, the residue from the second distillaton is enriched in, and can consist substantially of, the aliphatic alcohol. The lower the second distillation pressure, the larger is the proportion of alkoxyacetone in the second distillate. If this second distillation pressure is low enough, the distillation may become non-azeotropic and the second distillate then be substantially the alkoxyacetone.

That fraction from the second step distillation which consists of, or is rich in, aliphatic alcohol can be returned to the feed to the first step distillation, thereby recovering the minor proportion of alkoxyacetone contained in such fraction and also thereby supplying the co-distillation agent necessary in the feed to the first step distillation.

The method of the invention can be practiced in continuous manner by carrying out the two distillation continuously and simultaneously as shown by the flow sheet in the drawing. To the first distillation is fed a mixture of alkoxyacetone and alkoxy-2-propanol together with one of the aforementioned aliphatic alcohols as a co-distillation agent. Continuously from the first distillation step is removed a residue which consists of, or is rich in, the alkoxy-2-propanol and a distillate which comprises an azeotropic mixture of the alkoxyacetone and the aliphatic alcohol and which is substantially free of the alkoxy-2-propanol. That distillate from the first step distillation is then fed to a second distillation step, at a distillation pressure different from that of the first distillation step. Continuously from the second distillation step is removed a residue fraction and a distillate fraction, in one of which the proportion of aliphatic alcohol is greater than in the feed to that second distillation step. The other fraction consists of, or is rich in, the alkoxyacetone, and is substantially free of alkoxy-2-propanol. That fraction from the second distillation step which consists of, or is rich in, the aliphatic alcohol co-distillation agent is returned to the first distillation step together with the alkoxyacetone and alkoxy-2-propanol starting material. Thereafter, only make-up quantities of aliphatic alcohol are required to be added to the process, since the aliphatic alcohol is effectively cycled through the two distillation steps.

The following examples illustrate the invention, but are not to be construed as limiting its scope.

*Example 1*

To a mixture of methoxyacetone (1-methoxy-2-propanone) and 1-methoxy-2-propanol, which mixture distilled azeotropically at atmospheric pressure, was added n-propyl alcohol (1-propanol), and the resulting mixture was distilled at 50 mm. of mercury absolute pressure. A distillate was obtained which contained 40 percent by weight methoxyacetone and 60 percent by weight n-propyl alcohol. The distillation residue was substantially pure 1-methoxy-2-propanol.

The distillate obtained as described at 50 mm. pressure was redistilled at atmospheric pressure, whereby there was obtained a second distillate consisting of 15 percent by weight methoxyacetone and 85 percent by weight n-propyl alcohol and a second residue which was substantially pure methoxyacetone.

*Example 2*

By a procedure similar to that described in Example 1, a mixture of methoxyacetone, 1-methoxy-2-propanol and isopropyl alcohol (2-propanol) was distilled at 50 mm. of mercury absolute pressure. A distillate consisting of 43 percent by weight methoxyacetone and 57 percent by weight isopropyl alcohol was separated from a residue which was substantially 1-methoxy-2-propanol. Redistillation at atmospheric pressure of the distillate gave a residue which was substantially methoxyacetone and a distillate which contained only 17 percent by weight methoxyacetone and 83 percent by weight isopropyl alcohol.

*Example 3*

1-ethoxy-2-propanol was oxidatively dehydrogenated by heating to 100° C., drawing air therethrough and passing the gases, i. e. air laden with vapors of 1-ethoxy-2-propanol, over a silver gauze catalyst at a temperature of 415°–440° C. at atmospheric pressure. From the resulting reaction product there was obtained a mixture containing 86 percent by weight ethoxyacetone and 14 percent by weight 1-ethoxy-2-propanol, which mixture distilled azeotropically at atmospheric pressure and could not be separated by simple distillation. To 240 grams of that mixture was added 200 grams of n-butyl alcohol (1-butanol). The resulting mixture was distilled at 18 mm. of mercury absolute pressure. There were obtained 310 grams of a distillate fraction containing 62 percent by weight ethoxyacetone and 38 percent by weight n-butyl alcohol and a 1-ethoxy-2-propanol residue containing only 3.5 percent by weight ethoxyacetone (corresponding to 96.5 percent by weight 1-ethoxy-2-propanol). The 1-ethoxy-2-propanol residue was suitable for returning to the oxidation step. The 310-gram distillate fraction was redistilled at atmospheric pressure, whereby there were obtained a distillate containing 22 percent by weight ethoxyacetone and 78 percent by weight n-butyl alcohol, and a residue which analyzed 91 percent by weight ethoxyacetone.

I claim:

1. A method which comprises subjecting to fractional distillation a mixture of a 1-alkoxy-2-propanone and the corresponding 1-alkoxy-2-propanol that forms an azeotrope when distilled at approximately atmospheric pressure, the alkoxy group in the 1-alkoxy-2-propanone and 1-alkoxy-2-propanol having from one to three carbon atoms, together with an unsubstituted monohydric aliphatic alcohol having a normal boiling point between 78° and 160° C. and within 30° C. of the boiling point of the 1-alkoxy-2-propanone, to obtain a mixture of the aliphatic alcohol and the 1-alkoxy-2-propanone as distillate and to obtain a residue which is richer than the starting material in the 1-alkoxy-2-propanol.

2. A method according to claim 1 wherein the 1-alkoxy-2-propanone and the 1-alkoxy-2-propanol are 1-methoxy-2-propanone and 1-methoxy-2-propanol, respectively.

3. A method according to claim 1 wherein the 1-alkoxy-2-propanone and the 1-alkoxy-2-propanol are 1-ethoxy-2-propanone and 1-ethoxy-2-propanol, respectively.

4. A method according to claim 1 which comprises the further step of redistilling the distillate at a distillation pressure which is substantially different from that at which the distillate was obtained to form a second distillate and a second residue, one of which is richer in the 1-alkoxy-2-propanone than is the other.

5. A method according to claim 1 which comprises the further step of redistilling the distillate at a distillation pressure which is substantially higher than that at which the distillate was obtained to form a second distillate and a second residue, which second residue is richer than the second distillate in 1-alkoxy-2-propanone.

6. A method for the separation of a 1-alkoxy-2-propanol from a mixture thereof with the corresponding 1-alkoxy-2-propanone that is azeotropic when distilled at approximately atmospheric pressure, the alkoxy group in the 1-alkoxy-2-propanone and 1-alkoxy-2-propanol having from one to three carbon atoms, which method comprises distilling the mixture together with an unsubstituted monohydric aliphatic alcohol having a normal boiling point between 78° and 160° C. and within 30° C. of the boiling point of the 1-alkoxy-2-propanone to obtain a mixture of the aliphatic alcohol and the 1-alkoxy-2-propanone as distillate and to obtain a residue which consists substantially of 1-alkoxy-2-propanol.

7. A method according to claim 6 wherein the 1-alkoxy-2-propanol and 1-alkoxy-2-propanone are 1-methoxy-2-propanol and 1-methoxy-2-propanone, respectively.

8. A method according to claim 6 wherein the 1-alkoxy-2-propanol and 1-alkoxy-2-propanone are 1-ethoxy-2-propanol and 1-ethoxy-2-propanone, respectively.

9. A method for the separation of a 1-alkoxy-2-propanone from a mixture thereof with the corresponding 1-alkoxy-2-propanol that is azeotropic when distilled at approximately atmospheric pressure, the alkoxy group in the 1-alkoxy-2-propanone and 1-alkoxy-2-propanol having from one to three carbon atoms, which method comprises distilling the mixture together with an unsubstituted monohydric aliphatic alcohol having a normal boiling point between 78° and 160° C. and within 30° C. of the boiling point of the 1-alkoxy-2-propanone at a first distillation pressure to obtain a distillate which contains an appreciable proportion of the 1-alkoxy-2-propanone and is substantially free of 1-alkoxy-2-propanol, and redistilling said distillate at a second distillation pressure which is substantially higher than the first distillation pressure to obtain a second distillate which is richer than the first distillate in the aliphatic alcohol and to obtain a second residue which consists substantially of 1-alkoxy-2-propanone.

10. A method according to claim 9 wherein the 1-alkoxy-2-propanone and 1-alkoxy-2-propanol are 1-methoxy-2-propanone and 1-methoxy-2-propanol, respectively.

11. A method according to claim 9 wherein the 1-alkoxy-2-propanone and 1-alkoxy-2-propanol are 1-ethoxy-2-propanone and 1-ethoxy-2-propanol, respectively.

12. A method for the separation of a mixture of 1-alkoxy-2-propanol and the corresponding 1-alkoxy-2-propanone, each having from one to three carbon atoms in its alkoxy radical, which mixture is azeotropic when distilled at approximately atmospheric pressure, comprising the steps of continuously feeding said mixture to a first fractional distillation together with an unsubstituted monohydric aliphatic alcohol having a normal boiling point between 78° and 160° C. and within 30° C. of the boiling point of the 1-alkoxy-2-propanone, continuously removing a first distillate fraction and a first residue fraction, which first distillate fraction contains appreciable proportions of the 1-alkoxy-2-propanone and of the aliphatic alcohol and is substantially free of the 1-alkoxy-2-propanol, and which first residue fraction consists substantially of 1-alkoxy-2-propanol, continuously feeding said first distillate fraction to a second fractional distillation at a distillation pressure which is substantially different from the distillation pressure in the first fractional distillation, continuously removing a second distillate fraction and a second residue fraction, one of which second fractions is richer than the first distillate fraction in the 1-alkoxy-2-propanone and the other of which second fractions is richer than the first distillate fraction in the aliphatic alcohol, and continuously returning to the first fractional distillation that second fraction which is richer in the aliphatic alcohol.

13. A method according to claim 12 wherein the second fractional distillation is carried out at a distillation pressure which is substantially higher than the first distillation pressure to obtain continuously a second distillate fraction which is appreciably richer than the first distillate fraction in the aliphatic alcohol and a second residue which consists substantially of 1-alkoxy-2-propanone, and continuously returning the second distillate fraction to the first fractional distillation.

14. A method according to claim 13 wherein the 1-alkoxy-2-propanol and 1-alkoxy-2-propanone are 1-methoxy-2-propanol and 1-methoxy-2-propanone, respectively.

15. A method according to claim 13 wherein the 1-alkoxy-2-propanol and 1-alkoxy-2-propanone are 1-ethoxy-2-propanol and 1-ethoxy-2-propanone, respectively.

16. In a method for making a 1-alkoxy-2-propanone by dehydrogenation of a corresponding 1-alkoxy-2-propanol that has from 1 to 3 carbon atoms in its alkoxy radical whereby there is obtained a mixture of the 1-alkoxy-2-propanol and the 1-alkoxy-2-propanone that forms an azeotrope when distilled at approximately atmospheric pressure, the steps of separating the 1-alkoxy-2-propanol from the 1-alkoxy-2-propanone by subjecting that mixture to fractional distillation together with an unsubstituted monohydric aliphatic alcohol having a normal boiling point between 78° and 160° C. and within 30° C. of the boiling point of the 1-alkoxy-2-propanone to obtain a mixture of the aliphatic alcohol and the 1-alkoxy-2-propanone as distillate and to obtain a residue which consists substantially of the 1-alkoxy-2-propanol, and returning that residue to the dehydrogenation step.

References Cited in the file of this patent

UNITED STATES PATENTS

| | | |
|---|---|---|
| 2,080,194 | Barbet | May 11, 1937 |
| 2,170,855 | Chitwood | Aug. 29, 1939 |
| 2,265,939 | Fields | Dec. 9, 1941 |
| 2,324,255 | Britton et al. | July 13, 1943 |
| 2,614,072 | Carlson | Oct. 14, 1952 |
| 2,617,757 | Michael | Nov. 11, 1952 |
| 2,681,882 | Grekel | June 22, 1954 |